(12) United States Patent
Laukhuf

(10) Patent No.: US 6,183,280 B1
(45) Date of Patent: Feb. 6, 2001

(54) WIRE DISTRIBUTION SYSTEM FOR FURNITURE

(75) Inventor: Gregg E. Laukhuf, Bryan, OH (US)

(73) Assignee: Dekko Engineering, Inc., Butler, IN (US)

( * ) Notice: Under 35 U.S.C. 154(b), the term of this patent shall be extended for 0 days.

(21) Appl. No.: 09/274,255

(22) Filed: Mar. 22, 1999

(51) Int. Cl.$^7$ ................................................ H01R 4/60
(52) U.S. Cl. ............................................. 439/214; 439/654
(58) Field of Search .................................... 439/214, 215, 439/654, 650, 210–213, 112–119; 108/50.02

(56) References Cited

U.S. PATENT DOCUMENTS

| | | | |
|---|---|---|---|
| 1,189,435 | * | 4/1916 | Edmands ............................ 439/457 |
| 2,866,956 | | 12/1958 | Miller et al. . |
| 4,045,911 | | 9/1977 | Ware . |
| 4,094,256 | | 6/1978 | Holper et al. . |
| 4,270,020 | * | 5/1981 | Kenworthy et al. .................... 174/48 |
| 4,500,150 | | 2/1985 | Leibensperger et al. . |
| 5,516,298 | * | 5/1996 | Smith .................................... 439/131 |
| 5,709,156 | | 1/1998 | Gevaert et al. . |
| 5,715,761 | * | 2/1998 | Frattini ................................. 108/50 |
| 5,718,179 | | 2/1998 | Johnson et al. . |
| 5,967,820 | * | 10/1999 | Siegal et al. ......................... 439/214 |

FOREIGN PATENT DOCUMENTS 0 010 277   10/1978   (DE) .

\* cited by examiner

Primary Examiner—Brian Sircus
Assistant Examiner—Son V. Nguyen
(74) Attorney, Agent, or Firm—Taylor & Aust, P.C.

(57) ABSTRACT

A wire distribution system for furniture, especially for electric power, communications, and data includes a common feed-in source. In one embodiment, the common feed-in source is a leg assembly adapted to carry the incoming wires. A distribution beam attached to the piece of furniture and defining a trough, carries a distribution harness, which together carry and distribute the power and communications/data wires. Exiting wires from the leg assembly are connected to the distribution harness. The distribution beam has electric receptacles and communications/data jacks, and includes a connectors/plugs to which is attached a connector/plug emanating from the leg assembly carrying the wires. Various pieces of furniture may be coupled together wherein the various distribution beams/harnesses may be coupled together via jumpers.

12 Claims, 5 Drawing Sheets

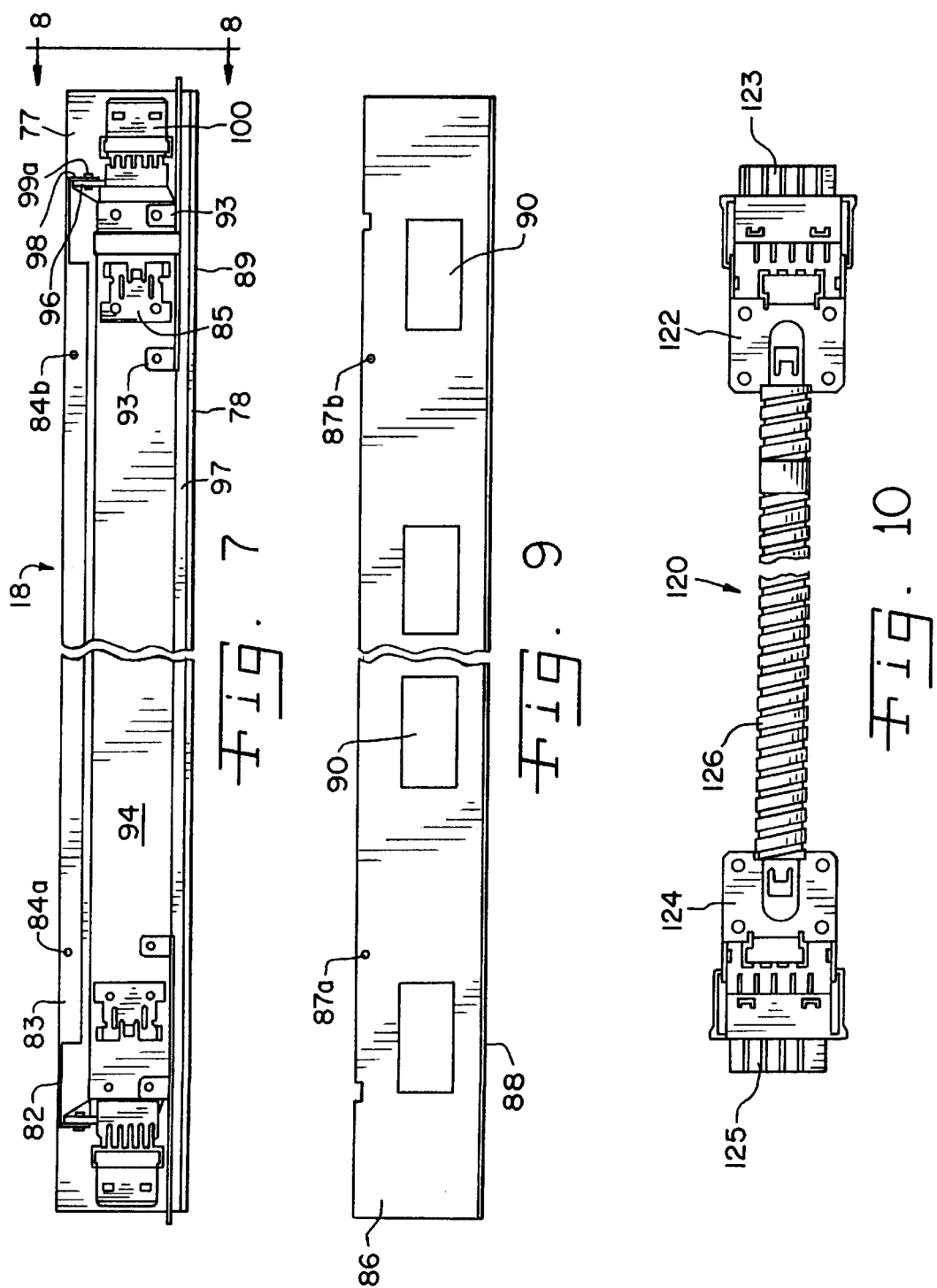

WIRE DISTRIBUTION SYSTEM FOR FURNITURE

BACKGROUND OF THE INVENTION

1. Field of the Invention

The present invention relates to wire distribution systems for furniture and, more particularly, to electric, communication, and data wire distribution systems for furniture such as tables.

2. Description of the Related Art

Because of the proliferation and need for electric receptacles, communication/data jacks, and the like, coupled with the increased need for various pieces of equipment at a work station or table which utilize such receptacles and/or jacks, there is a need for office furniture to be located proximate these types of receptacles and jacks. Additionally, as the modern work area evolves, there exists a need to be able to work in spaces not typically defined by a closed office having four walls, or by cubicles incorporating power and/or communication distribution systems.

Because such power receptacles and communication/data jacks are generally fixed in location, the location of the office furniture is thereby constrained else wires and cables are strewn about the floor. Therefore, office furniture needs to be more flexible and portable.

In view of the above, articles of furniture that have legs with wire management capabilities are known in the art. Such articles range from tables to desks to other types of furniture. Other arrangements for providing wiring have also been devised, such as work tables having integral side supports in which are disposed the wiring.

However, with all of these articles of furniture, there still lacks arrangement flexibility and/or the ability to easily couple various or same pieces of work furniture together while still maintaining wire management.

SUMMARY OF THE INVENTION

The present invention is directed to a wire distribution system for furniture such as tables.

In one embodiment, the wire distribution system includes a distribution beam having a housing that is mountable to a piece of furniture and which defines an internal trough. The distribution beam retains a distribution harness within the trough which is connectable to incoming wires and couplable with appropriate receptacles and/or jacks mounted to the distribution beam.

In one form, the distribution harness is adapted to couple to and distribute electrical power from electrical wires to electrical receptacles, while communications/data wires are carried within a channel or wire passageway in the trough and is distributed to appropriate communication/data jacks.

The distribution beam preferably includes a removable cover plate that has cutouts for the various electrical receptacles, communication/data jacks and other types of receptacles and/or jacks as necessary.

The distribution harness utilizes connectors or plugs in order to provide the necessary interface between the incoming wires and any outgoing wires, as well as to the various types of receptacles and/or jacks.

Additionally, through the use of jumpers, two or more distribution beams/harness, either attached to the same piece of furniture or to separate pieces of furniture, may be coupled together while sharing a common wire feed-in source such as a furniture leg.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 7 is a plan view of a distribution beam with its cover plate removed showing the distribution harness carried therein in accordance with the present invention;

FIG. 9 is plan view of the removable cover plate for the distribution beam of FIG. 7;

FIG. 10 is a plan view of an end return jumper in accordance with the present invention;

Corresponding reference characters indicate corresponding parts throughout the several views. The exemplification set out herein illustrates a preferred embodiment of the invention, in one form, and such exemplification is not to be construed as limiting the scope of the invention in any manner.

DETAILED DESCRIPTION OF THE INVENTION

Figure 1:
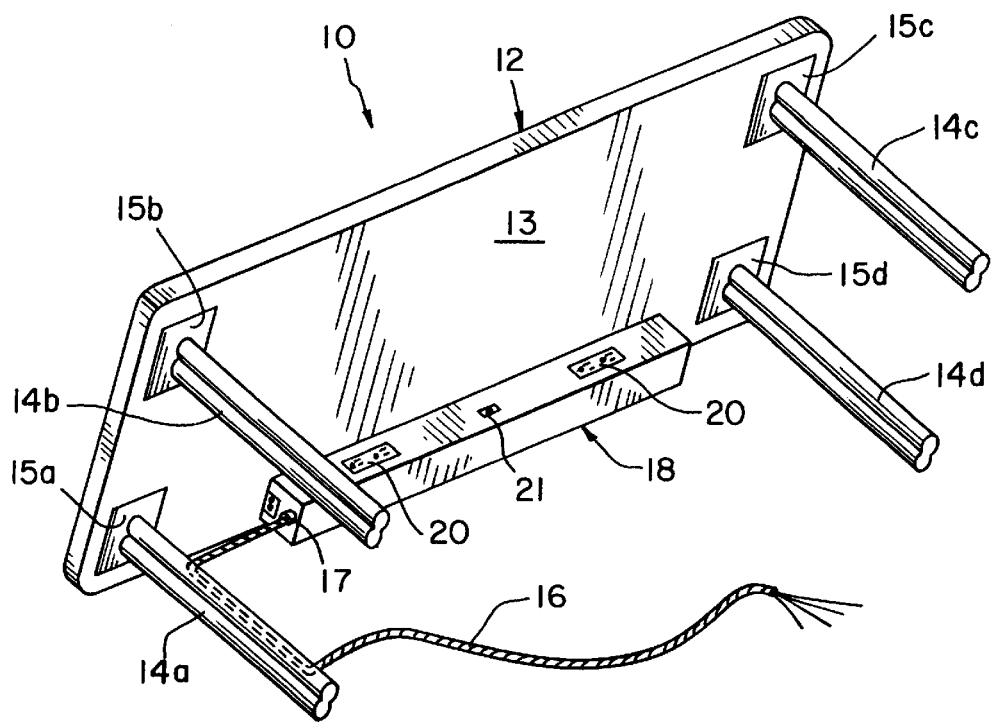
FIG. 1 is an underside perspective view of a free standing table having the present wire distribution system.

Referring now the drawings and more particularly to FIG. 1, there is shown free standing table 10 incorporating the present wire distribution system. Table 10 has table top 12 defining undersurface 13 onto which are mounted four (4) table leg or support assemblies 14a, 14b, 14c, and 14d via respective attachment plates 15a, 15b, 15c, and 15d. Leg assemblies 14a, 14b, 14c, and 14d are preferably identical in design and appearance, and are depicted as such, but may or may not include or utilize wire distribution channels as described below. It is also possible that only one leg assembly include the various wire distribution features and capabilities described herein, with the remaining leg assemblies having only the outside appearance being the same with no wire housing capacity. In FIG. 1, leg assembly 14a is the designated wire distribution or the feed-in leg assembly since it houses or carries power/communication/data cable 16. Cable 16 includes various power, communication, data and/or other wiring and is routed into leg assembly 14a at the bottom thereof and exits proximate the top thereof.

Cable 16 is a bundle of various types of wiring, each coupled at what is shown as its free end to a suitable electric power supply or source (not shown), communications/data equipment or source (not shown), and any other type of wired equipment or source as appropriate. The other end of cable 16 terminates, in the case of the electric wires, in plug or connector terminal 17. The communication/data wires preferably do not terminate in connector 17, but instead exits as free wires. Any additional wiring may or may not utilize connector 17, depending on design considerations. Connector 17 is a clamshell type connector as is known in the art and provides interfacing ease with distribution subassembly/harness 94 (see FIG. 7) within distribution beam 18. Distribution beam 18 supports any number and style of electric power receptacles 20 and any number and style of communication/data jacks, of which one communication/data jack 21 is shown, on cover plate 86 or on other sides thereof. Of course, any other type of receptacle or jack can be supported on any side of distribution beam 18. While only one piece of furniture, here a table, and distribution beam 18 is shown, several tables with distribution beams may be coupled together with the power, communication, and data wires emanating from a common source.

Figure 2:
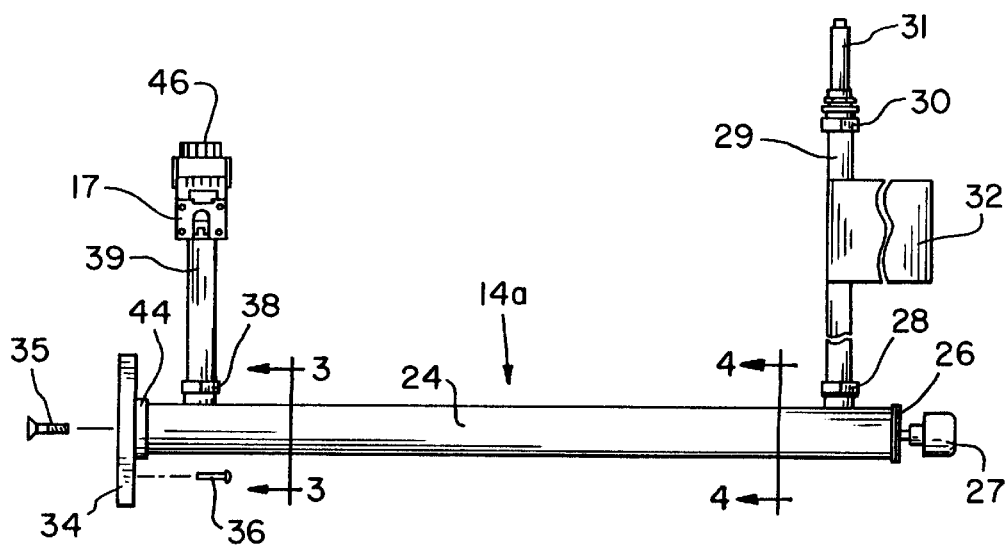
FIG. 2 is a side plan view of a left hand table leg assembly according to the present invention having a rectangular leg plate.

With reference to FIG. 2 leg assembly 14a is shown in more detail. Leg assembly 14a, again being preferably representative of all leg assemblies, includes leg member 24 of a generally elongated or tubular length preferably terminating at the bottom with leg cap 26 and foot or leveler 27 for stabilizing the table. Alternatively, casters (not shown) may be used in place of foot or leveler 27 to enable the table to be portable. At the top of leg assembly 14a is leg plate 34 used to attach leg member 24 to the table. Leg plate 34 has rim 44 of a shape complementary to the outside shape of leg member 24 so as to receive leg member 24 therein and is coupled thereto via screws or fasteners of which only one screw 35 is shown. It should be noted that for simplicity, leg assemblies 14a–d in FIG. 1 are shown without leg caps and levelers. Proximate leg cap 26 and thus at the bottom of leg member 24 when mounted onto table top 12 is fitting 28 that provides access to the interior of leg member 24. Attached to fitting 28 is a suitable length of tubing or conduit 29 terminating in another fitting 30 coupling a connector piece 31, all of which carries cable 16 from the exterior of leg member 24 to the interior of leg member 24. Warning or information label 32 may be attached to conduit 29.

Figure 3:
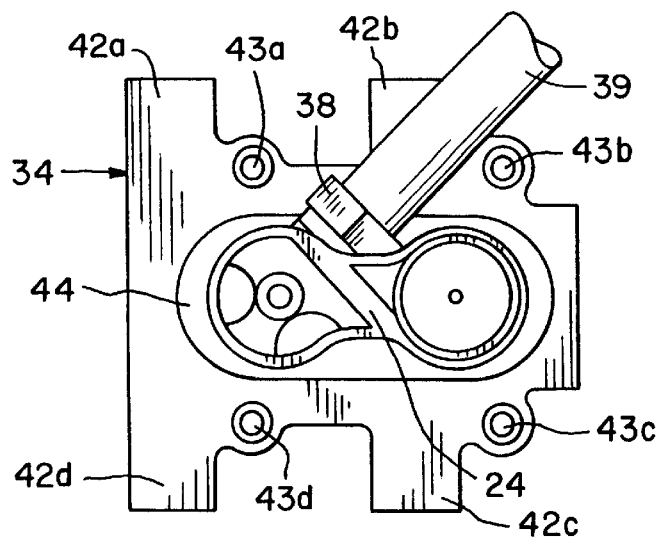
FIG. 3 is a cross-sectional view of the table leg of FIG. 2 taken along line 3—3 thereof generally showing the rectangular leg plate.

With additional reference to FIG. 3, an underside view (that which is opposite from underside 13 of table 12 when mounted thereon) is shown of leg plate 34 taken along line 3—3 of FIG. 2. Leg plate 34 is essentially rectangular in shape and includes four projections or tabs 42a, 42b, 42c, and 42d on the four corners thereof. Projections 42a, 42b, 42c, and 42d provide lateral stability upon mounting. Mounting of leg plate 24 to underside 13 of table 12 is accomplished by use of screws, of which only one screw 36 is depicted in FIG. 2 for illustration, through four mounting bores 43a, 43b, 43c, and 43d. Rim 44 is formed on one side of plate 34 opposite from underside 13 of table 12 when mounted thereon, and is configured to receive an end of leg member 24.

Figure 6:
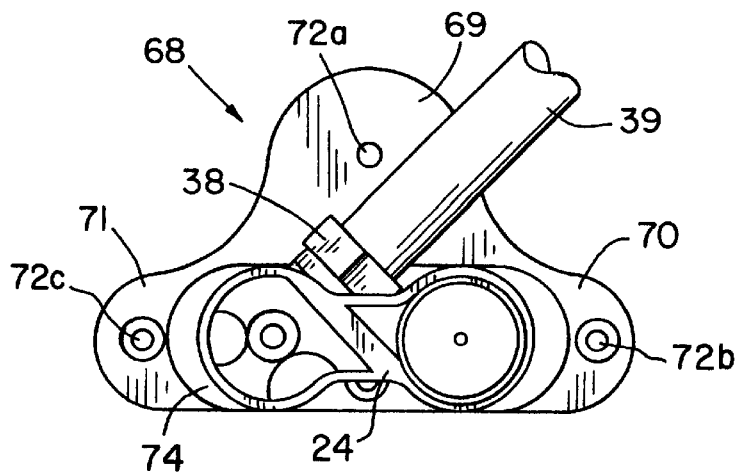
FIG. 6 is a cross-sectional view of the table leg of FIG. 2 taken along line 3—3 thereof generally showing an alternative trapezoidal leg plate.

An alternative style leg plate 68 is depicted in FIG. 6 and reference is now made thereto. The view of FIG. 6 is along the same line as FIG. 3. Leg plate 68 is generally trapezoidal in shape having three tabs 69, 70, and 71 each having a respective mounting bore 72a, 72b, and 72c for attaching leg plate 68 to undersurface 13 of table top 12. Mounting rim or ridge 74 is disposed on one surface of leg plate 68 and is shaped to received leg member 24. As is evident from the alternative style of leg plate described above, virtually any configuration style of leg plate may be used.

Figure 4:
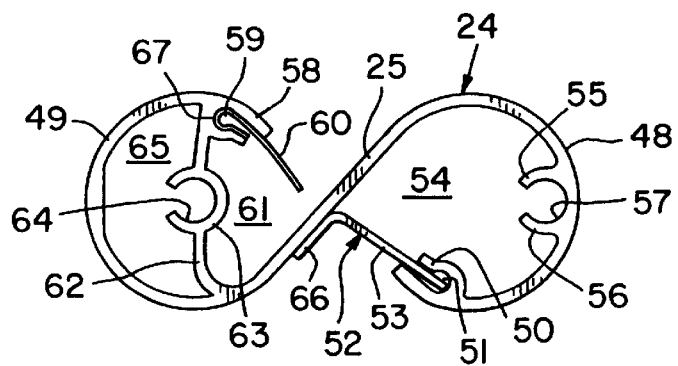
FIG. 4 is a cross-sectional view of the table leg of FIG. 2 taken along line 4—4 thereof.

With reference now to FIG. 4, leg member 24 will now be described in greater detail. Leg member 24 is configured as an integral bent or curled sheet so as to have an essentially "S" shaped cross section. This configuration defines first curled side 48, second curled side 49, and middle wall member 25. First curled side 48 defines first elongate slot 54, while a portion of second curled side 49 and wall portion 62 defines second elongate slot 61. At the end of first curled side 48 is integrally formed clip structure 50 having clip channel 51 together constituting a clip. One end of wall portion 53 of L-shaped member 52 is retained by clip structure 50 while the other end of L-shaped member 52 defines wall portion 66. Wall portion 66 rests upon or abuts middle wall portion 25 of leg member 24 such that slot 54 becomes an enclosed channel. Extending from one interior side of second curled side 49 to another interior side of second curled side 49 is divider or separator 62. Disposed approximate the middle of divider 62 is arcuate portion 63 defining channel 64 therein. Channel 64 is threaded to receive one of the screws of the leg plate. Additionally, divider 62 also defines elongate channel 65. Second curled side 49 terminates in integrally formed clip structure 58 having clip channel 59 together constituting a clip. Hook portion 67 on one end of squeegee member 60 is retained by clip structure 58 such that slot 61 becomes an enclosed channel. Because member 60 is flexible, cable 16 and/or any other wiring can thus be fed into channel 54 and/or channel 57 after member 60 is in place. It should be understood that the following structures as described herein generally extend the longitudinal length of leg member 24 while any other not so listed but described above do not. The listed structures include clip structure 50 and associated clip channel 51, L-shaped member 52, clip 58 and associated channel 59, squeegee 60, and separation member 62. Defined channel 61 preferably houses what is termed in the industry "dirty" wires, i.e. electrical or power cables and wires, while defined channel 54 preferably houses the communication, data, and other similar wiring. Industry standards require that electrical or power cables may not be placed or housed immediately adjacent to data/communication cables or wires. Thus, adjacent channels 54 and 61 are separated by wall member 25.

Figure 5:
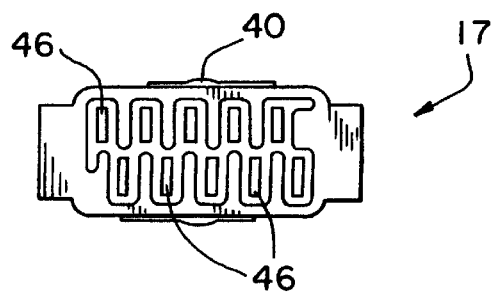
FIG. 5 is an end plan view of a wiring connector/plug according to the present invention.

With reference back to FIG. 2 fitting 38 is disposed in leg member 24 proximate leg plate 34 and provides internal access to defined channels 54 and 61 of leg member 24 from outside thereof. In the same manner, fitting 28 provides the same access but at a different location on leg member 24 (see FIG. 2). Attached to fitting 38 is a suitable length of tubing or conduit 39 through which cable 16 extends and which terminates in terminal connector/plug 17. Thus, cable 16 is routed into leg member 24 via conduit 29, distributed into the proper channels and thereout via conduit 39 terminating in connector/plug 17. The power wires of cable 16 are coupled to connector/plug 17. Referring to FIG. 5, an end view of connector/plug 17 is depicted. Connector/plug 17 has clamshell type housing 40 and a plurality of terminals 46 that extend therefrom. The various power wires are coupled to terminals 46 within the interior of housing 40.

Figure 8:
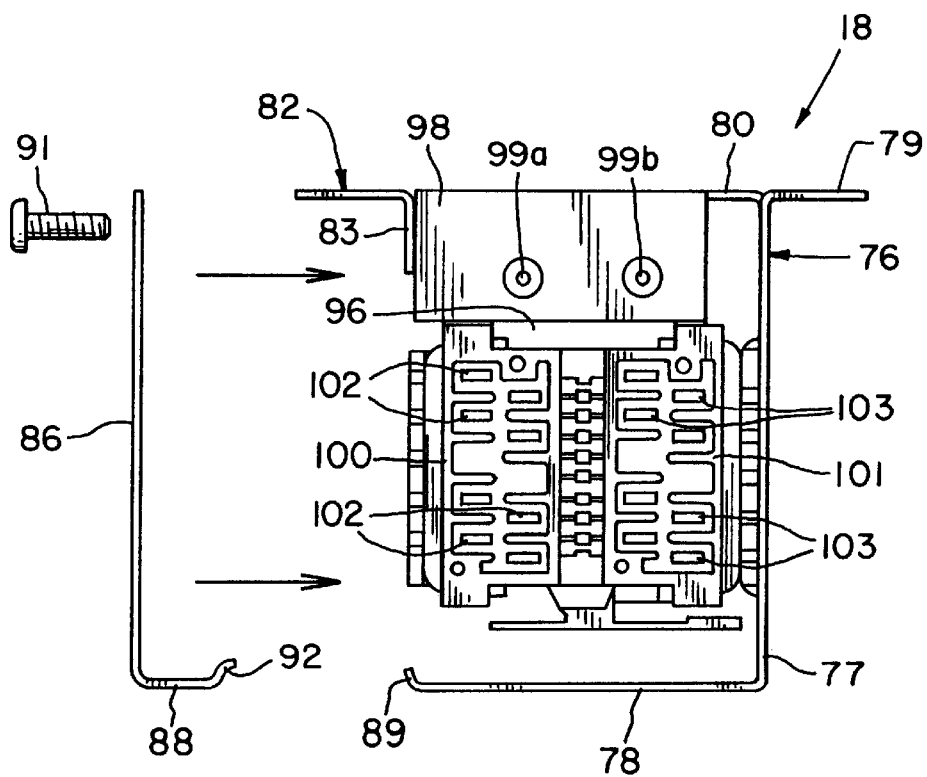
FIG. 8 is a side view of the distribution beam and distribution harness taken along line 8—8 of FIG. 7.

As depicted in FIG. 1, connector/plug 17 is coupled to the wire distribution system consisting of distribution beam 18 and distribution subassembly/harness 94. Referring now to FIGS. 7, 8, and 9, distribution beam 18 and distribution harness 94 are shown in greater detail. When assembled, distribution beam 18 defines an internal trough for distribution harness 94 and communications/data cable. Distribution beam 18 has housing portion 76 that includes elongate side 77, elongate bottom 78, and elongate top 80. Flange 79 is disposed at a right angle to elongate side 77 and includes mounting bores (not seen) along its length that receives screws, bolts, or the like (not shown) for mounting distribution beam 18 to underside 13 of table 12. Attached to top 80 is elongate right angle piece 82 that also includes mounting bores (not seen) along its upper length that receives screws, bolts, or the like (not shown) for mounting distribution beam 18 to underside 13 of table 12. Right angle piece 82 along with flange 79 provide mounting stability and security of distribution beam 18 onto the table. Downward extending portion 83 of right angle piece 82 includes mounting bores 84a and 84b in order to secure elongate mounting plate 86 thereon. Cover plate 86 includes a plurality of cutouts 90 through which electrical receptacles 20 (see FIG. 1) and/or communication/data jacks 21 (see FIG. 1) and/or any other type of receptacle or jack.

With particular reference to FIG. 9, mounting plate 86 includes mounting bores 87a and 87b that correspond in location to mounting bores 84a and 84b. Screws, bolts or the like, of which one screw 91 is depicted in FIG. 8, are used to removably attach cover plate 86 to downward extending portion 83 and thus complete the enclosure of distribution beam 18. To facilitate mounting of cover plate 86, lip 92 of right angle portion 88 allows lip 89 of bottom side 78 to go under right angle portion 88. Thus right angle portion 88 is interior of bottom piece 78 when installed.

Housed within distribution beam 18 is distribution subassembly/harness 94. While hereafter in this paragraph the attachment of distribution harness 94 to distribution beam 18, and the end configuration thereof, will be described with reference to only one end of distribution harness, (e.g. that end depicted in FIG. 8), it should be understood that the same structure and principles applies equally to the other end thereof. Distribution harness 94 includes mounting plate 96 which is attached to downward extending plate 98 of distribution beam 18 that is integral with top 80 via rivets 99a and 99b or the like. Thus, distribution harness 94 is suspended within the trough defined by the housing of distribution beam 18. Disposed at the end of distribution harness 94 are two clamshell connectors/plugs 100 and 101 each having a plurality of receiving terminals 102 and 103 respectively. Connectors/plugs 100 and 101 are designed to accept or couple with connector/plug 17 and those similar thereto. Preferably, the connectors/plugs described herein distribute electric power, while communications and/or other wiring is separate therefrom. This, however, is not necessary as the connectors/plugs may be used for any and all types of wiring. The suspension of distribution harness 94 within distribution beam 18 creates a channel 97 between the inside surface of bottom member 78 and the underside of distribution harness 94. Riveted to distribution harness 94 underneath the connectors/plugs 100 and 101 is horizontal plate 93. Receptacle clip 85 is situated to receive an electrical receptacle.

Figure 11:
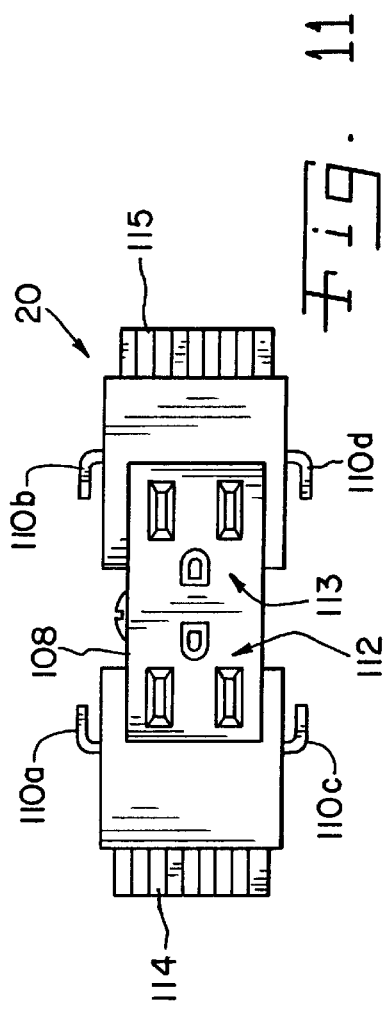
FIG. 11 is a top plan view of an electrical receptacle for use with the present invention.

Electric power distribution is accomplished by the distribution harness 94 through receipt of power through connector/plug 17 (FIG. 1) and one of the end connectors/plugs (e.g. connectors/plugs 100 and 101 of FIG. 8) of distribution harness 94. As described above, electrical receptacles 20 are disposed in cover plate 86, retained by clips 85, and wired to distribution harness 94 so as to receive electric power therefrom. Referring now to FIG. 11 representative electrical receptacle 20 is depicted. Receptacle 20 has body 108 with four extending hook flanges 110a, 110b, 110c, and 110d, first and second outlets 112 and 113 with corresponding terminals 114 and 115 respectively. Terminals 114 and 115 are wired to the apertures of the outlets 112 and 113 in known manner.

Regarding communication wiring distribution, when distribution harness 94 is mounted within distribution beam 18 enough clearance exists between the distribution harness and the bottom of distribution beam 18 (see FIG. 8) to allow communications and/or data and other wiring to extend therethrough and be coupled to appropriate jacks mounted onto the cover plate.

In accordance with an aspect of the present invention, many tables each having a wire distribution system can be arranged in various configurations with each wire distribution system in communication with another wire distribution system. Thus, tables as described herein may be coupled to one another in known fashion as by clasps or the like wherein a common leg assembly serves as a common wiring feed-in source (leg). In order to couple the distribution harnesses from each table to each other, a jumper is provided that allows connection from the connector/plug of one distribution harness to the connector/plug of another distribution harness. Depending on the number of connectors/plugs on the end of the distribution harness, multiple jumpers may be necessary. This allows flexibility in furniture arrangement.

Figure 12:
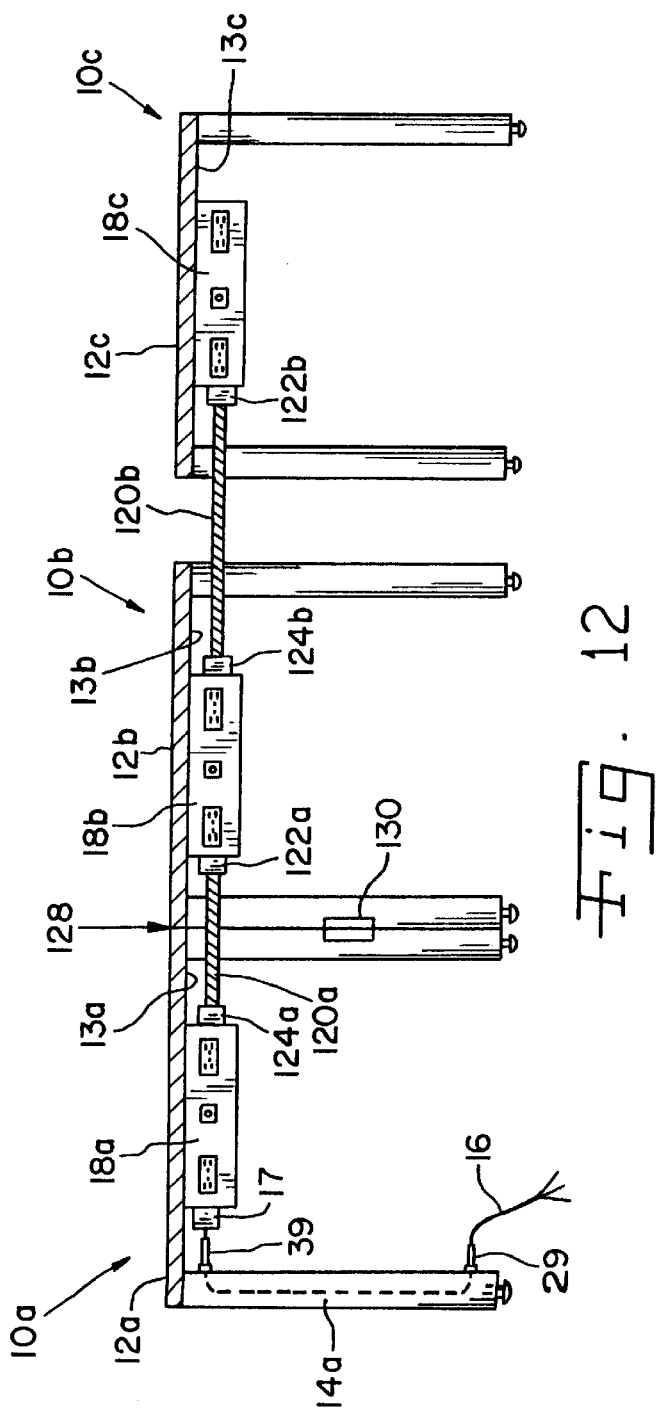
FIG. 12 is a side sectional view of a plurality of interrelated tables each having an interconnected wire distribution assembly fed by a common source.

With reference to FIG. 10 jumper 120 as mentioned above is depicted. Jumper 120 includes first clamshell connector/plug 122 having terminals 123 and second clamshell connector/plug 124 having terminals 125 that are in communication with one another via wires (not seen) housed within flexible conduit 126. Any communication/data wires are also carried by flexible conduit 126 and may or may not utilize the connectors/plugs. As an illustration of the above principles with regard to the interconnectivity of the wire distribution assemblies and the furniture to which they are attached, reference is now additionally directed to FIG. 12. FIG. 12 depicts three tables 10a, 10b, and 10c each having a respective table top 12a, 12b, with each table top 12a, 12b, and 12c each defining a respective underside/surface 13a, 13b, and 13c. Of course, it should be recognized, that the three tables depicted in FIG. 12 are representational of any configuration, including number, of interconnected/interrelated tables. Table 10b is attached to table 10a at junction 128 in a manner known in the art such as clasp/latch 130 and, preferably, in more than one place (only one being shown), while table 10c is spaced a distance from table 10b. Table 10a includes distribution beam 18a attached to underside 13a thereof which is coupled to cable 16 via connector/plug 17. In like manner to that which was previously described with reference to FIG. 2, cable 16 enters conduit 29 coupled to leg 14a and exits leg 14a via conduit 39. Connector/Plug 124a on one end of jumper 120a is coupled to the connector/plug (not shown) on one end of the distribution harness (not shown) that is interior to distribution beam 18a, while connector/plug 122a on another end of jumper 120a is coupled to the connector/plug (not shown) on the distribution harness (not shown) of distribution beam 18b. Further, connector/plug 124b on one end of jumper 120b is coupled to the connector/plug (not shown) of the other end of the distribution harness (not shown) that is interior to distribution beam 18b. Connector/plug 122b on the other end of jumper 120b is coupled to the connector/plug (not shown) on one end of the distribution harness (not shown) that is interior to distribution beam 18c.

In this manner, cable 16 and leg 14a of table 10a provide the feed-in point of the distribution system as depicted in FIG. 12. Distribution beam 18a receives its power and communication/data wires cable 16, distribution beam 18b receives its power and communication/data wires via jumper 120a, while distribution beam 18c receives its power and communication/data wires via jumper 120b. While no other tables are depicted, many more may be interconnected in accordance with the principles of the present invention as described above, with the only constraint being the electrical capacity of the lines and equipment being used, due consideration being given thereto.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for distributing electrical power, the system comprising:
    a piece of furniture including a leg having:
        at least one channel; and
        at least one fitting in communication with said at least one channel;
    at least one conduit, each said conduit being attached to a respective said fitting;
    a plurality of electrical power wires routed through each of said at least one channel, said at least one fitting and said at least one conduit, said electrical power wires terminating in a first electrical power connector, said electrical power wires being configured for transmitting the electrical power from a source of electrical power;
    a distribution beam having a housing defining an internal cavity, said housing having a cover plate with a plurality of cutouts, and mounting flanges attaching said distribution beam to said piece of furniture;
    a distribution harness retained in said internal cavity and having a second electrical power connector coupled with the first electrical power connector, and a third electrical power connector adapted to couple to a fourth electrical power connector; and
    a plurality of electrical receptacles accessible through said plurality of cutouts and in communication with said distribution harness to receive the electrical power therefrom.

2. The system for distributing electrical power of claim 1, wherein said distribution harness is retained in said housing so as to define a wire passageway adapted to carry any additional wiring.

3. The system for distributing electrical power of claim 2, wherein said additional wiring is communication/data wiring and said distribution beam includes a communication/data jack coupled to said communication/data wiring.

4. The system for distributing electrical power of claim 2, wherein said distribution harness is riveted to said distribution beam so as to be suspended therein, whereby said wire passageway is defined between an inside surface of said housing of said distribution beam and an outside surface of said distribution harness.

5. The system for distributing electrical power of claim 1, wherein said cover plate is removable.

6. The system for distributing electrical power of claim 1, further comprising a jumper having a fourth connector as said another connector and adapted to couple to and receive electrical power from said third electrical power connector of said distribution harness and having a fifth connector adapted to couple to a first connector of a second distribution harness of a second distribution beam.

7. A system for distributing electrical power to a plurality of tables, the system comprising:
    a plurality of distribution systems equal in number to the plurality of tables, each of said distribution systems including a distribution beam having a housing being mounted onto a respective table of said plurality of tables, said housing including a housing portion with a bottom side, said housing also including a removable cover plate having a bottom portion disposed interior of said bottom side of said housing portion, a distribution harness retained in said housing of said distribution beam, said distribution harness including a first electrical power connector disposed at one end thereof and adapted to receive incoming electrical power, a second electrical power connector disposed at another end of said distribution harness, and said distribution beam including an electrical receptacle accessible through said removable cover plate and coupled to receive the electrical power from said distribution harness;
    wherein a first one of said distribution systems receives the electrical power from a source of electrical power via electrical wires terminating in a source connector being coupled to said first electrical power connector thereof; and
    a plurality of jumpers each having a first jumper connector adapted to couple to the second electrical power connector of a distribution harness, and a second jumper connector adapted to couple to the first electrical power connector of an other said distribution harness.

8. The system for distributing electrical power for a plurality of tables as in claim 7, wherein each said distribution harness is retained in said respective housing so as to define a wire passageway adapted to carry any additional wiring.

9. The system for distributing electrical power for a plurality of tables as in claim 8, wherein each said distribution harness is riveted to each respective said distribution beam so as to be suspended therein, whereby each said wire passageway is defined between an inside surface of each said housing of each said distribution beam and an outside surface of each said distribution harness.

10. The system for distributing electrical power for a plurality of tables as in claim 7, wherein each said cover plate includes a plurality of cutouts and wherein each said distribution system includes a plurality of electrical receptacles accessible through the plurality of cutouts and coupled to a respective said distribution harness.

11. The system for distributing electrical power for a plurality of tables as in claim 7, wherein said bottom side of said housing portion includes a first upwardly flanged lip, said bottom portion of said cover plate including a second upwardly flanged lip configured for allowing said first upwardly flanged lip of said housing portion to be slid under said bottom portion of said cover plate.

12. The system for distributing electrical power for a plurality of tables as in claim 7, wherein said housing portion includes at least one substantially horizontal flange configured for engaging an underside of the respective table and receiving at least one fastening device for mounting said distribution beam to the underside of the respective table.

* * * * *